June 21, 1932.   A. CHURCHWARD   1,863,833
WELDING APPARATUS
Filed April 17, 1930
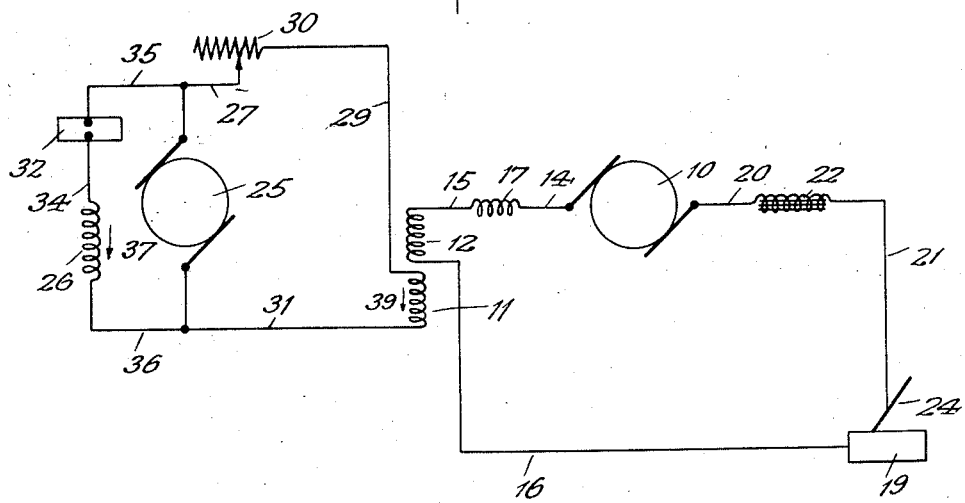
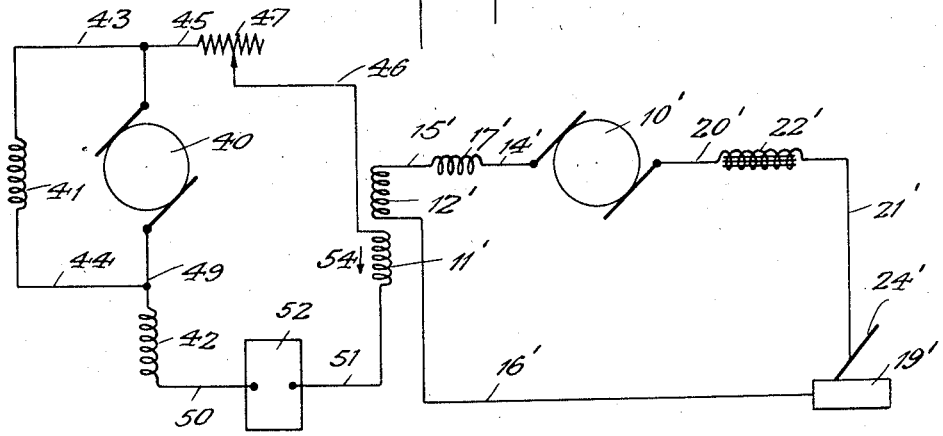
INVENTOR
Alexander Churchward
BY
Williams Rich Morse
ATTORNEY Patented June 21, 1932

1,863,833

UNITED STATES PATENT OFFICE

ALEXANDER CHURCHWARD, OF NEW YORK, N. Y., ASSIGNOR TO WILSON WELDER & METALS COMPANY, INC., OF HOBOKEN, NEW JERSEY, A CORPORATION OF NEW YORK

WELDING APPARATUS

Application filed April 17, 1930. Serial No. 444,919.

The present invention relates to arc welding apparatus of the type employing a direct current welding generator having a separately excited field and a bucking series field. An apparatus of the character mentioned is usually provided with a generator as an exciter for supplying current to the separately excited field windings of the welding generator. When operating such an apparatus, such disturbances as breakdown or reversal of current in the exciter circuit, which includes the separately excited field windings, and in the welding circuit, which includes the bucking series field windings, very often take effect, as a result of undue inductive reaction between the separately excited field windings and the bucking series field windings of the welding generator.

The present invention has for its object to provide means which will substantially eliminate the harmful effects of inductive reaction between the separately excited field windings and the bucking series field windings of a welding generator, and which may be installed in a welding apparatus with ease and with little additional manufacturing cost.

The invention will be understood with the aid of the accompanying drawing in which Fig. 1 illustrates an embodiment of the invention, and Fig. 2 illustrates another embodiment of the invention.

In accordance with the invention, use is made of a rectifier unit permitting an electric current to pass therethrough in only one direction. I have determined that such a rectifier unit, when positioned in operative association with the circuit of the exciter, substantially eliminates all harmful effects of undue fluctuations of current, breakdown or reversal of current in the exciter circuit or in the welding circuit.

Fig. 1 represents a welding generator having an armature 10, separately excited field windings 11 and bucking series field windings 12. One of the brushes of this generator is connected by conductors 14, 15 and 16 through the usual interpole windings 17 and the bucking series field windings 12 to the work 19. The other brush of the welding generator is connected by conductors 20 and 21, through the usual reactance unit 22, to the welding electrode 24 on the work 19. Any suitable means may be provided to vary the current in the welding circuit described.

In the embodiment of the invention shown in Fig. 1, a shunt generator as an exciter (diagrammatically indicated at the left side of the figure) supplies the required current to the separately excited field windings 11. This exciter comprises an armature 25 and shunt field windings 26. One of the terminals of the exciter is connected by the conductors 27 and 29 through a variable resistance 30 to one side of the separately excited field windings 11 of the welding generator. The other terminal of the exciter is connected by the conductor 31 to the other side of the aforesaid field windings 11 of the welding generator. The variable resistance 30 serves to adjust the strength of the current through the windings 11, so as to obtain a variation of the open circuit voltage of the welding generator and, if desired, a variation of the welding current in the welding circuit described.

A rectifier unit 32, preferably of the type using a high and low contact resistance offered by two contacting dissimilar bodies to the passage of currents of opposite direction, is placed in the circuit of the shunt field windings 26, a conductor 34 connecting the rectifier unit 32 in series with the windings 26 and conductors 35 and 36 connecting the rectifier unit 32 and windings 26 across the armature 25 of the exciter.

Harmful effects of undue inductive reaction between the windings of the separately excited field and of the bucking series field of a welding generator, such as undue fluctuations of current, breakdown or reversal of current in the circuit of the separately excited field windings or in the welding circuit, may be attributed to numerous causes, as, for example, a sudden throwing on of the load on the welding generator with the welding electrode and a return conductor short circuited, or a variation of the current in the welding circuit when adjusting the strength of the separately excited field, or a loose or poor brush contact at the exciter.

In Fig. 1, the rectifier unit 32 is so connected that it permits the passage of the normal current generated in the shunt field windings 26 of the exciter, as indicated by the arrow 37, but checks flow of current opposite in direction thereto. Obviously, the rectifier unit 32 acts to prevent an undue weakening or a reversal of current in the shunt field windings 26, which might otherwise occur, if the rectifier unit 32 were not present, by reason of a current induced in the separately excited field windings 11 by transformer action with the bucking series field windings 12. Thus, reversal of the polarity of the exciter is prevented, and said exciter is sustained in generating at all times a current of proper direction, as indicated by the arrow 39, in the exciter circuit including the separately excited field windings 11. No breakdown of current in the circuit of the exciter by demagnetization of the field structure of the exciter is possible, and breakdown or reversal of current in the welding circuit by undue weakening of the separately excited field of the welding generator is substantially prevented. I have determined that the rectifier unit 32 is highly effective in the elimination of all harmful effects of inductive reaction between the separately excited field windings 11 and the bucking series field windings 12 of the welding generator.

The welding generator illustrated in Fig. 2 is similar in construction to that shown in Fig. 1 and supplies current in a welding circuit including the work 19' and the electrode 24' thereon. For the purpose of brevity, the welding generator of Fig. 2 will not be described, corresponding numerals, primed, being employed in connection with the welding generator of Fig. 2 to indicate parts corresponding to similar parts of the welding generator of Fig. 1.

In the embodiment of the invention shown in Fig. 2, a shunt compound generator as an exciter (diagrammatically indicated at the left of this figure) supplies the required current to the separately excited field windings 11' of the welding generator. This exciter comprises an armature 40, shunt field windings 41 and cumulative compound windings 42. The shunt field windings 41 are connected by conductors 43 and 44 across the armature 40 of the exciter. One of the terminals of the exciter is connected by the conductors 45 and 46 through the variable resistance 47 to one side of the separately excited field windings 11' of the welding generator. The other terminal or brush of the exciter is connected by conductors 49, 50 and 51 through the cumulative compound windings 42 and a rectifier unit 52 to the other side of the aforesaid windings 11' of the welding generator.

The rectifier unit 52 is so connected as to permit passage of the normal current in the exciter circuit including the windings 11' of the welding generator and the windings 42 of the exciter, as indicated by the arrow 54, but checks flow of current opposite in direction to said normal current. By preventing reversal of current in the exciter circuit, the rectifier unit 52, it has been determined, is highly effective in eliminating all harmful effects of inductive reaction between the separately excited field windings 11' and the bucking series field windings 12' of the welding generator. Evidently, satisfactory results would also be obtained by placing a rectifier unit in the circuit of the shunt field windings 41 in the manner described in connection with the exciter shown in Fig. 1. A rectifier unit placed in the exciter circuit as shown in Fig 2 is also advantageous in eliminating harmful effects of inductive reaction between the separately excited field windings and the bucking series field windings of a welding generator, when the separately excited field windings of the latter are supplied with current from an ordinary shunt generator having no cumulative compound windings.

From the above description it becomes apparent that a rectifier unit, made use of as described, is of very small size, particularly when installed in the circuit of the shunt field windings of the exciter by reason of the comparatively low values of current in said windings which it is required to check, and may be installed in a welding apparatus with very little additional cost.

What is claimed is:

1. In combination with a welding generator having separately excited field windings and bucking series field windings; means, for supplying current to the separately excited field windings of the welding generator comprising a direct current generator having shunt field windings and a rectifier unit connected in the circuit of said shunt field windings.

2. In combination with a welding generator having separately excited field windings and bucking series field windings, means for supplying current to the separately excited field windings comprising a direct current generator having an armature connected in a circuit with said separately excited field windings and shunt field windings connected in a circuit with said armature, and a rectifying unit connected in series with said armature in one of said circuits.

In testimony whereof, I have affixed my signature to this specification.

ALEXANDER CHURCHWARD.